March 28, 1939.    L. E. LA BRIE    2,152,065

DUPLEX MASTER CYLINDER

Filed July 29, 1935    2 Sheets-Sheet 1

INVENTOR.
LUDGER E. LA BRIE
BY F. P. Keiper
ATTORNEY

March 28, 1939.  L. E. LA BRIE  2,152,065

DUPLEX MASTER CYLINDER

Filed July 29, 1935  2 Sheets—Sheet 2

INVENTOR.
LUDGER E. LA BRIE
BY Jerome R. Cox
ATTORNEY.

Patented Mar. 28, 1939

2,152,065

UNITED STATES PATENT OFFICE 2,152,065

DUPLEX MASTER CYLINDER

Ludger E. La Brie, South Bend, Ind., assignor to Bendix Products Corporation, South Bend, Ind., a corporation of Indiana Application July 29, 1935, Serial No. 33,732

8 Claims. (Cl. 60—54.5)

This invention relates to brake systems and more particularly to automotive braking systems of the hydraulic type wherein a single master cylinder may operate a plurality of independent wheel cylinders.

In braking systems of the type above described, although perfect equalization is obtained at the various wheel cylinders, a serious difficulty arises due to the inherent danger of the system failing at some point by leakage and thereby destroying the entire system. The present invention is therefore directed to a master cylinder construction which is adapted to deliver fluid to brake cylinders with equalized pressure as long as the quantities delivered are nearly equal or equal within fixed limits. Thus leakage beyond a certain amount in one part of the system will not destroy the braking pressure in another part of the system.

It is accordingly an object of this invention to provide a master cylinder construction adapted to deliver equalized pressure to wheel cylinders and protect the operation of certain cylinders upon failure of others.

Another object of the invention is to provide a master cylinder structure satisfying the above requirement and yet of simple structure.

A further object of the invention is to provide in a single cylinder bore a pair of pistons adapted to deliver liquid to wheel brakes, with a partition therebetween, the partition having sufficient movement to establish equalized pressures on either side thereof, but adapted to be restrained from excessive movements.

The above and other objects and novel features of the invention will appear more fully hereinafter from the following detailed description when taken in conjunction with the drawings. It is expressly understood however that the drawings are employed for purposes of illustration only and are not designed as a definition of the limits of the invention, reference being had for this purpose to the appended claims.

In the drawings wherein like reference numerals indicate like parts:

Figure 1:
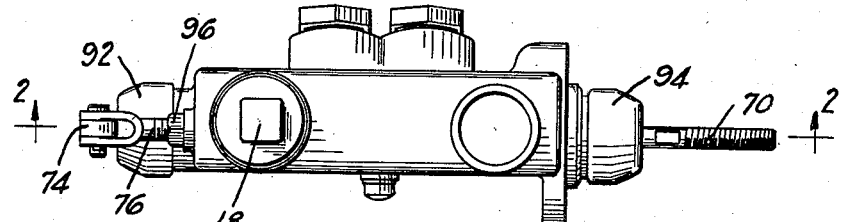
Fig. 1 is a top plan view of the master cylinder.
Figure 2:
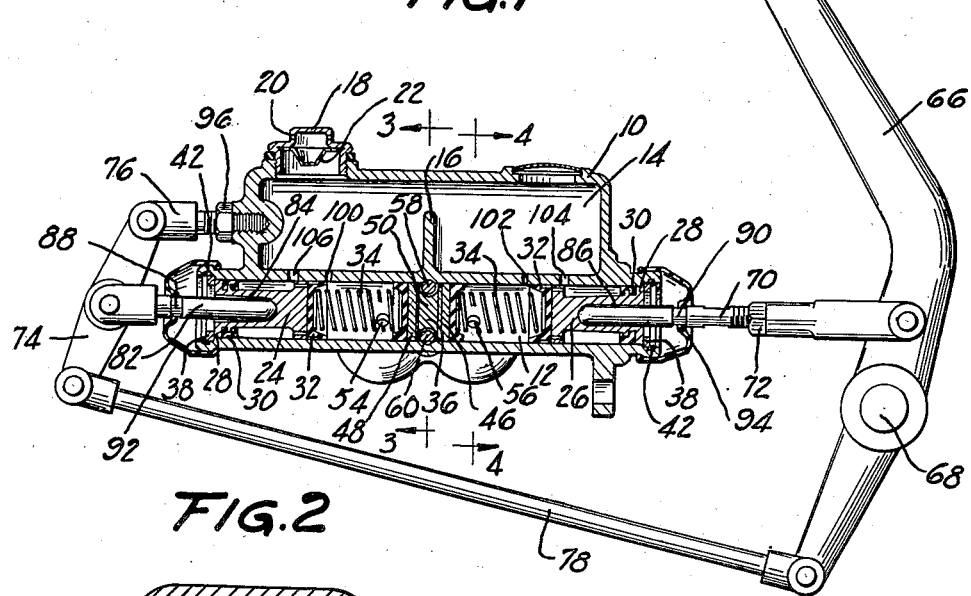
Fig. 2 is a vertical section taken thru Fig. 1 on the line 2—2.

Referring to the drawings and more particularly to Fig. 2, there is shown a master cylinder comprising a casing 10 having a cylindrical horizontal bore 12 and a reservoir 14 located thereabove. The reservoir due to its length is preferably divided in the center by an upstanding partition 16 to prevent undue movement of the liquid due to acceleration and inclination of the vehicle and the reservoir also is provided with a common type filler cap 18 having air bleed holes 20, and a baffle 22 to prevent egress of fluid due to splashing.

Each end of the cylinder bore is similar and pistons are arranged therein in symmetrical fashion. Each of the pistons 24 and 26 are of the spool type having a rear flange 28 provided with an annular washer 30. The forward end is provided with a cup shape washer 32 held in position by a spring 34 which abuts against a central partition 36 hereinafter more fully described.

The outer ends of the cylinder are enlarged and carry a washer 38 forming a flange for limiting the movement of the pistons outwardly of the cylinder, the washer being secured in position by suitable lock rings 42.

Centrally within the cylinder is provided a sliding partition 36 or piston of spool shape having flanges 46 and 48 on either side of a reduced portion 50. The end faces of the piston are provided with cup packings which are held in place by the springs 34 heretofore referred to in conjunction with the packings 32 on pistons 24 and 26.

In order to permit equalization of pressures developed in the two ends of the cylinders by the pistons 24 and 26, the partition 36 is permitted to slide axially within the cylinder, and each cylinder is connected to a separate braking system by means of the discharge ports 54 and 56.

To protect against absolute failure of the system due to breakage of a pipe or loss of liquid in any one of the systems, fed thru ports 54 and 56, the central piston is limited in its axial travel. As shown in Fig. 2 and also Fig. 3, transverse pins 58 and 60 are inserted in bores intersecting tangentially the bore of the cylinder 12, the pins being positioned around the reduced portion 50 of the central partition so as to be engaged by the flanges 46 and 48 of the partition as soon as a limited amount of movement has taken place, thus providing for equalization between the two ends of the cylinder so long as the demands of the two braking systems are substantially identical.

Actuation of the pistons simultaneously by a single pedal control is accomplished thru a suitable linkage comprising a pedal lever 66 pivoted at 68 and operating a piston rod 70, this rod preferably being adjustable as shown at 72; together with a second lever 74 pivoted on a support 76 on the casing, this latter lever being connected to the pedal lever 66 by a link 78, and operating a piston rod 82. The piston rods 82 and 70 are received in recesses 84 and 86 in each of the pistons 24 and 26 and each rod is provided with an annular recess 88 and 90 adapted to receive a dust cup or boot 92 and 94, the rim of which is secured over and around the respective ends of the cylinder. The support 76 is made adjustable as at 96 so that in practice each piston may be adjusted irrespective of the other.

Each of the discharge ports 54 and 56 may be provided with a check valve, the same preferably being double acting where compensating ports 100 and 102 are employed between the reservoir and cylinder just forward of the return position of the operating pistons 24 and 26 together with larger ports 104 and 106 just behind the forward flange of the spool shaped operating pistons. In such a case, the double check valve may comprise a cup shaped member 110 having an outwardly extending flange around the rim thereof for engagement with a spring 112 which is adapted to cause the rim of the cup to seat upon an annular washer 114. At the same time the side wall of the cup 110 is provided with one or more ports 116 and an inwardly projecting ridge 118 on the inside close to the base thereof to hold a cup shaped washer of complementary contour, the lip or rim of the washer being relatively thin and flexible and adapted to cover the ports 116. It will thus be readily seen that the rim of the cup 110 seated by the spring 112 on the annular washer 114 checks flow in one direction and restrains flow in the other direction unless sufficient pressure such as that caused by the return springs in the wheel cylinders exists, in which event fluid may flow back into the master cylinder. It will also readily appear that free discharge of liquid from the master cylinder is permitted thru the ports 116 in the side wall of the cup 110 since the thin walled rubber cup within readily flexes to uncover the ports 116 and permit flow.

Figure 5:
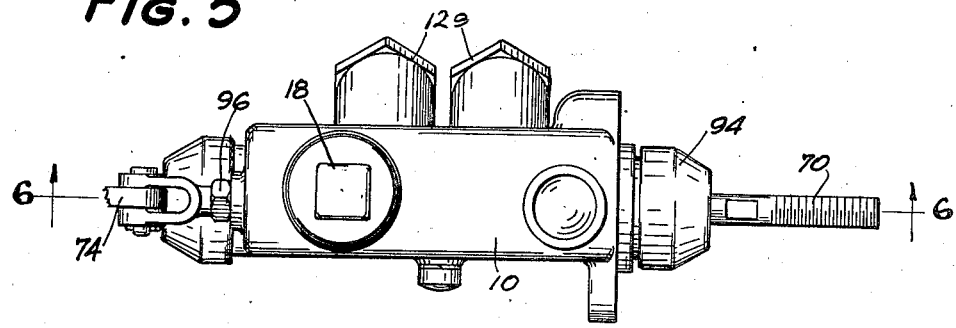
Figure 5 is a top plan view of a modified form of master cylinder.
Figure 6:
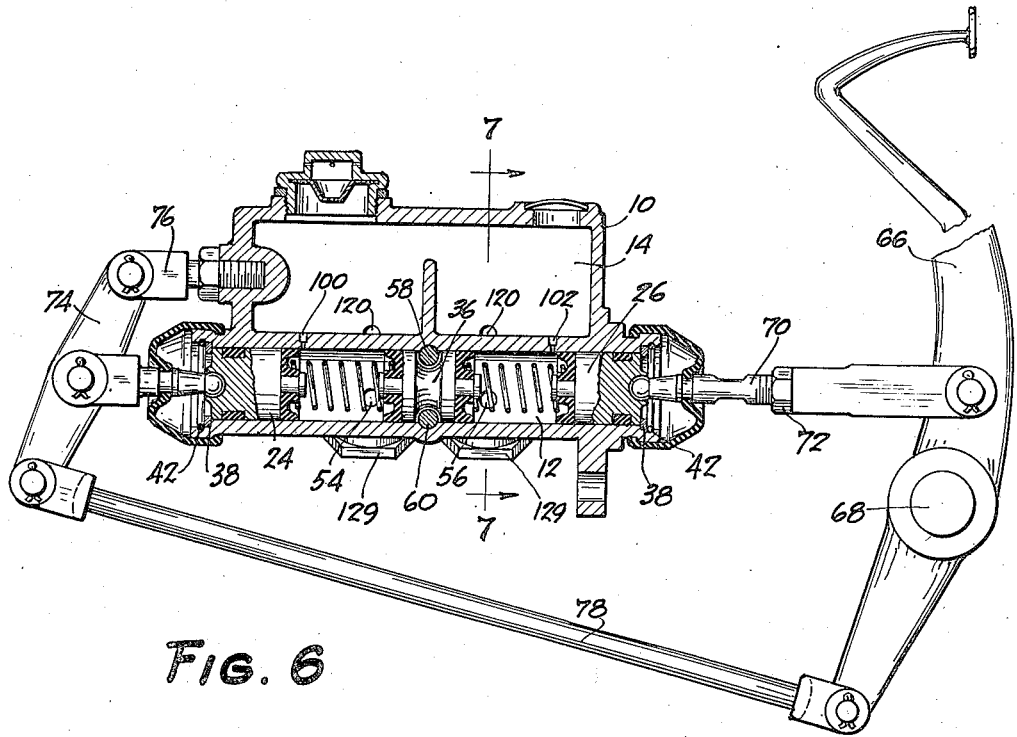
Figure 6 is a vertical section taken through Figure 5 on the line 6—6.

An alternative arrangement may be employed to assure against vacuum conditions in the line, such as shown in Fig. 5. When such a construction is used the larger ports 104 and 106 between the cylinder and reservoir may be dispensed of in lieu of ports such as 120 which connect the reservoir with the discharge port 54, but thru a check valve 122 inserted into the port 120 and carrying a washer head 126 thereon adapted to engage a conical seat 128 provided in an enlarged portion adjacent the discharge port 54 and in communication therewith. The enlarged portion is bored and threaded to receive an annular plug 129 which carries one end of a spring 130, the other end of which is piloted on a coaxial projection 132 on the valve core or stem 124. It will thus be seen that the valve remains seated during brake application due to pressure and the spring. On brake release, the master piston tends to produce a vacuum, and due to the constricted bore 134 in the annular plug 129, the valve is unseated and liquid may then flow into the master cylinder from the reservoir, thus avoiding any temporary vacuum condition.

Figures 3, 4, 7:
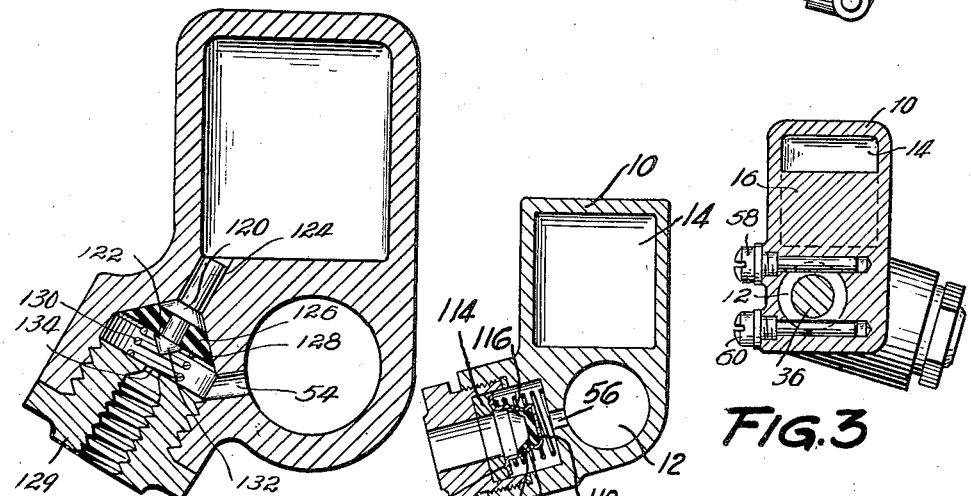
Fig. 3 is a section taken thru Fig. 2 on the line 3—3.
Fig. 4 is an enlarged section taken thru Fig. 2 on the line 4—4.
Figure 7 is an enlarged section taken through Figure 6 on line 7—7.

Although the operation may be readily understood from the above description the master cylinder when employed with the double check of Fig. 4, will obviously force liquid thru the check valve ports 116 to the wheel cylinders. Quick return of the piston will not produce vacuum conditions in the brake system line, since the cup 110 seated by the spring 112 causes the master piston to draw liquid from the reservoir thru the large ports 104 and 106, which then passes by the cup washers 32 on the pistons to satisfy the deficiency in the cylinder forward of the piston prior to opening of the check valve. In response to pressure produced in the line by the return springs of the wheel cylinders the check valve may be unseated and fluid returned to the master cylinder and reservoir.

There is thus provided a novel hydraulic master cylinder and braking system wherein simplification of parts may be noted as well as a system free from the dangers which result when vacuum conditions are allowed to exist in the cylinder lines, and also where in the danger of failure of the entire system due to leakage is avoided while retaining the property so highly desirable, that of equalization between systems.

Although but two embodiments of the invention are illustrated, in connection with the simple double piston construction, it is to be understood that the invention is not limited thereto but may be embodied in many other hydraulic and mechanical arrangements. Many changes may be made in the construction and arrangement of parts without departing from the spirit of the invention as will be apparent to those skilled in the art and reference will therefore be had to the appended claims for a definition of the limits of the invention.

What is claimed is:

1. In a master cylinder for hydraulic brakes a casing, a longitudinal cylindrical bore therethru actuating pistons in each end a central partition formed like a spool shaped piston, and pins passing transversely thru said cylinder to constrain said partition to a limited axial movement.

2. In a duplex master cylinder, a pair of pistons, means for actuating the pistons toward each other, an axially slidable partition formed like a spool-shaped piston and positioned between the pistons, means comprising pins passing transversely through said cylinder for limiting the axial movement of said partition, a reservoir, compensating ports from the reservoir to the cylinder just forward of each piston when in returned position, a discharge port between each piston and the partition, restrictions in said discharge ports, passages from the reservoir to each discharge port and check valves in said passages permitting flow of fluid only from the reservoir.

3. In a master cylinder for hydraulic brakes, a casing having a longitudinal cylindrical bore therethrough, actuating pistons in each end of said bore, a central partition formed like a spool-shaped piston in said cylindrical bore, means comprising pins passing transversely through said cylinder for constraining the partition to a limited axial movement, and a pair of bosses formed on one side of the casing, each boss being provided with a chamber connected with said cylindrical bore, one chamber being connected on one side of said partition and the other chamber being connected on the other side of said partition.

4. In a master cylinder for hydraulic brakes, a casing having a longitudinal cylindrical bore therethrough, actuating pistons in each end of said bore, a central partition formed like a spool-shaped piston in said cylindrical bore, means comprising pins passing transversely through said cylinder for constraining the partition to a limited axial movement, and a pair of bosses formed on one side of the casing, each boss being provided with a chamber connected with said cylindrical bore and having a connection leading therefrom for the operation of the brakes, one chamber being connected with said bore on one side of said partition and the other chamber being connected on the other side of said partition.

5. In a master cylinder for hydraulic brakes having a casing, a longitudinal cylindrical bore therethrough, actuating pistons in each end of said bore, a central partition formed like a spool-shaped piston in said cylindrical bore, means comprising pins passing transversely through said cylinder for constraining the partition to a limited axial movement, and a pair of bosses formed on one side of the casing, each boss being provided with a chamber having one connection with said cylindrical bore, having another connection leading therefrom for the operation of the brakes, and also having a check valve, one chamber being connected with said bore on one side of said partition and the other chamber being connected on the other side of said partition.

6. In a master cylinder for hydraulic brakes having a casing, a longitudinal cylindrical bore therethrough, actuating pistons in each end of said bore, a central partition formed like a spool-shaped piston in said cylindrical bore, means comprising pins passing transversely through said cylinder for constraining the partition to a limited axial movement, and a pair of bosses formed on one side of the casing, each boss being provided with a chamber having one connection with said cylindrical bore, having another connection leading therefrom for the operation of the brakes, having a third connection to the reservoir, and having a check valve, one chamber being connected with said bore on one side of said partition and the other chamber being connected on the other side of said partition.

7. In a master cylinder for hydraulic brakes having a casing, a longitudinal cylindrical bore therethrough, actuating pistons in each end of said bore, a central partition formed like a spool-shaped piston in said cylindrical bore, means comprising pins passing transversely through said cylinder for constraining the partition to a limited axial movement, and a pair of bosses formed on one side of the casing, each boss being provided with a chamber having one connection with said cylindrical bore, having another connection leading therefrom for the operation of the brakes, and also having a check valve arranged to maintain a residual pressure on the liquid in said connection leading to the brakes, one chamber being connected with said bore on one side of said partition and the other chamber being connected on the other side of said partition.

8. In a master cylinder for hydraulic brakes having a casing, a longitudinal cylindrical bore therethrough, actuating pistons in each end of said bore, a central partition formed like a spool-shaped piston in said cylindrical bore, means comprising pins passing transversely through said cylinder for constraining the partition to limited axial movement, and a pair of bosses formed on one side of the casing, each boss being provided with a chamber having one connection with said cylindrical bore, having another connection leading therefrom for the operation of the brakes, and also having a check valve, one chamber being connected with said bore on one side of said partition and the other chamber being connected on the other side of said partition, and a plug threaded into said boss and provided with a port forming said connection for the operation of said brakes.

LUDGER E. LA BRIE.